United States Patent [19]

Ross et al.

[11] 3,993,453

[45] Nov. 23, 1976

[54] GETTER FOR NUCLEAR FUEL ELEMENTS

[75] Inventors: Wilfred T. Ross, Wilmington, N.C.; Harold E. Williamson, San Jose, Calif.

[73] Assignee: General Electric Company, San Jose, Calif.

[22] Filed: June 13, 1975

[21] Appl. No.: 586,747

Related U.S. Application Data

[62] Division of Ser. No. 358,736, May 9, 1973, Pat. No. 3,969,185.

[52] U.S. Cl. .............................. 29/191.2; 29/191.6; 29/194; 29/196; 29/196.6; 176/68

[51] Int. Cl.[2] .............................. B23P 3/00

[58] Field of Search ............ 176/68, 79; 29/192 CP, 29/191.2, 194, 196, 196.6, 191.6

[56] References Cited

UNITED STATES PATENTS

| | | | |
|---|---|---|---|
| 3,141,830 | 7/1964 | Klepfer et al. | 176/68 |
| 3,344,036 | 9/1967 | Haslam et al. | 176/68 X |
| 3,406,094 | 10/1968 | Beisswenger et al. | 176/79 |
| 3,649,452 | 3/1972 | Chin et al. | 176/68 |
| 3,804,709 | 4/1974 | Penrose et al. | 176/68 |
| 3,845,177 | 10/1974 | Burnett et al. | 176/68 X |
| 3,898,125 | 8/1975 | Grossman et al. | 176/68 |
| 3,899,392 | 8/1975 | Grossman et al. | 176/68 |

*Primary Examiner*—Verlin R. Pendegrass
*Assistant Examiner*—Peter A. Nelson
*Attorney, Agent, or Firm*—Ivor J. James, Jr.; Sam E. Laub; Samuel E. Turner

[57] ABSTRACT

A nuclear fuel element for use in the core of a nuclear reactor is disclosed and has disposed therein an improved getter capable of gettering reactive gases including a source of hydrogen. The getter comprises a composite with a substrate having thereon a coating capable of gettering reactive gases. The substrate has a greater coefficient of thermal expansion than does the coating, and over a period of time at reactor operating temperatures any protective film on the coating is fractured at various places and fresh portions of the coating are exposed to getter reactive gases. With further passage of time at reactor operating temperatures a fracture of the protective film on the coating will grow into a crack in the coating exposing further portions of the coating capable of gettering reactive gases.

13 Claims, 5 Drawing Figures

14'
19
18
22
20
21
23
17
16
26

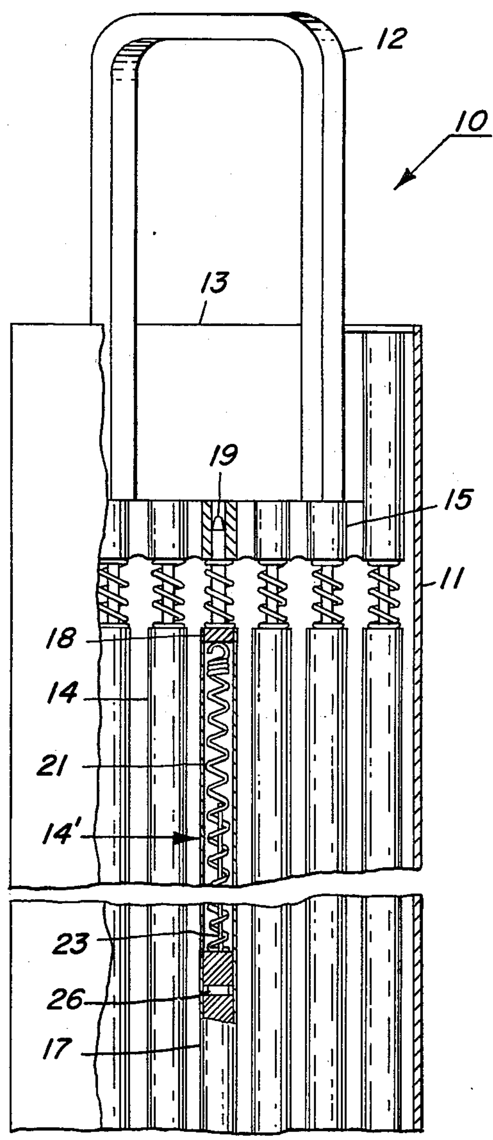
Fig. 1
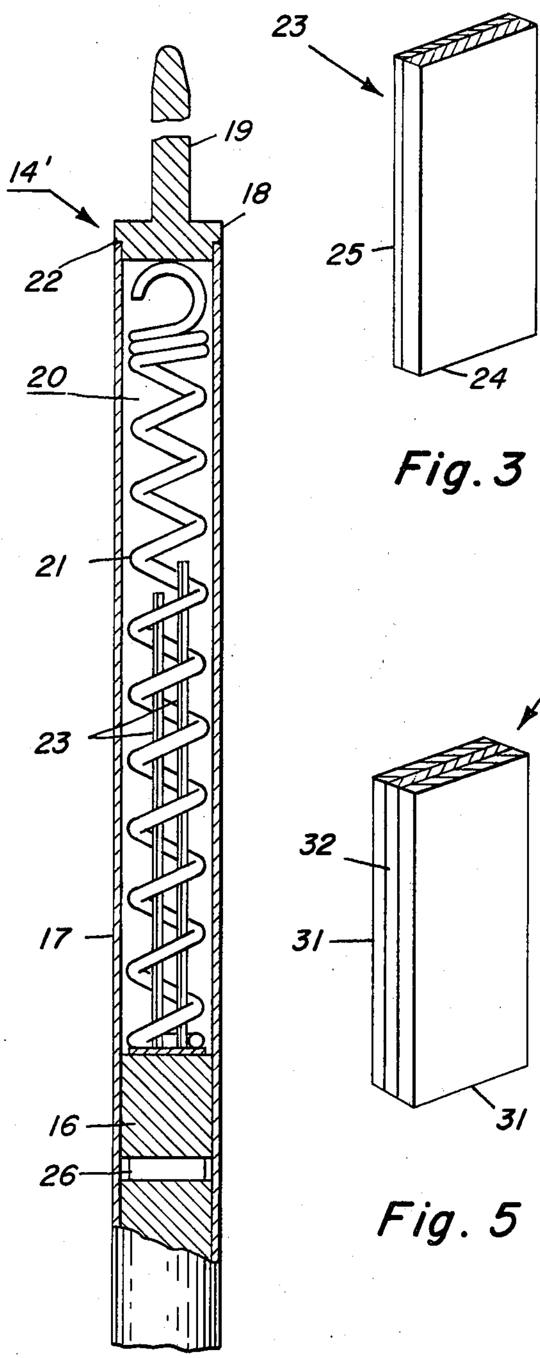
Fig. 2
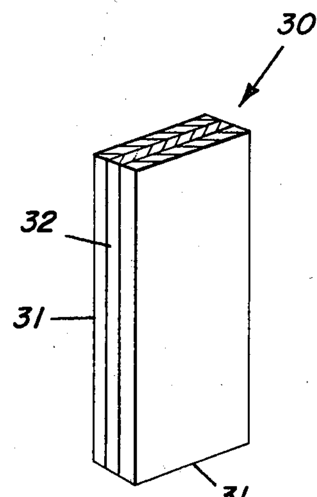
Fig. 3
Fig. 5
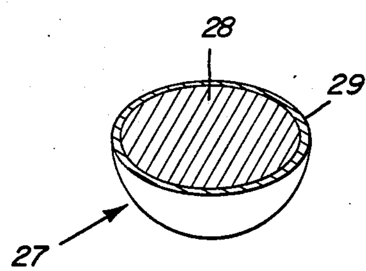
Fig. 4

GETTER FOR NUCLEAR FUEL ELEMENTS

CROSS-REFERENCE TO RELATED APPLICATIONS

This is a division of application Ser. No. 358,736, filed May 9, 1973, now U.S. Pat. No. 3,969,185.

BACKGROUND OF THE INVENTION

This invention relates broadly to an improvement in nuclear fuel elements for use in the core of nuclear fission reactors, and more particularly to an improved nuclear fuel element having therein a getter comprising a bimetallic composite having the components of (1) a metallic substrate having thereon (2) a coating capable of being fractured and covering at least a portion of the substrate. The coating is capable of gettering a source of hydrogen such as hydrogen, water vapor and hydrogen-containing compounds and gases.

Nuclear reactors are presently being designed, constructed and operated in which the nuclear fuel is contained in fuel elements which may have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves two primary purposes: first, to prevent contact and chemical reactions between the nuclear fuel and either the coolant or moderator if present, or both if both the coolant and moderator are present; and second, to prevent the radioactive fission products, some of which are gases, from being released from the fuel into the coolant or moderator or both if both the coolant, and moderator are present. Common cladding materials are stainless steel, aluminum and its alloys, zirconium and its alloys, niobium (columbium), certain magnesium alloys, and others. The failure of the cladding, due to the build-up of gas pressure or other reasons, can contaminate the coolant or moderator and the associated systems with radioactive longlived products to a degree which interferes with plant operation.

Problems have been encountered in the manufacture and in the operation of nuclear fuel elements which employ certain metals and alloys as the clad material due to the reactivity of these materials under certain circumstances. Zirconium and its alloys, under normal circumstances, are excellent materials as a nuclear fuel cladding since they have low neutron absorption cross sections and at temperatures below about 600° F are extremely stable and non-reactive in the presence of demineralized water or stream which are commonly used as reactor coolants and moderators. Within the confines of a sealed fuel element, however, the hydrogen gas generated by the slow reaction between the cladding and residual water may build up to levels which under certain conditions can result in localized hydriding of the cladding with concurrent deterioration in the mechanical properties of the cladding. The cladding is also adversely affected by such gases as oxygen, nitrogen, carbon monoxide and carbon dioxide over a wide range of temperatures.

The zirconium cladding of a nuclear fuel element is exposed to one or more of the gases given above during irradiation in a nuclear reactor in spite of the fact that these gases may not be present in the reactor coolant or moderator, and further may have been excluded as far as possible from the ambient atmosphere during manufacture of the cladding and the fuel element. Sintered refractory and ceramic compositions, such as uranium dioxide and others used as nuclear fuel, release measurable quantities of the aforementioned gases upon heating, such as during fuel element manufacture and especially during irradiation. Particulate refractory and ceramic compositions, such as uranium dioxide powder and other powders used as nuclear fuel, have been known to release even larger quantities of the aforementioned gases during irradiation. These gases react with zirconium cladding containing the nuclear fuel. This reaction can result in the embrittlement of the cladding which endangers the integrity of the fuel element. Although water and water vapor may not react directly to produce this result, at high temperatures water vapor does react with zirconium and zirconium alloys to produce hydrogen and this gas further reacts locally with the zirconium and zirconium alloys to cause embrittlement. These undesirable results are exaggerated by the release of these residual gases within the sealed metal-clad fuel element since it increases the internal pressure within the element and thus introduces stresses in the presence of corrosive conditions not anticipated in the original design of the cladding.

In light of the foregoing, it has been found desirable to minimize water, water vapor and other gases, especially hydrogen, reactive with the cladding from inside the fuel element throughout the time the fuel element is used in the operation of nuclear power plants. One such approach has been to find materials which will chemically react rapidly with the water, water vapor and other gases to eliminate these from the interior of the cladding, and such materials are called getters. While several getters for water and water vapor have been found, such as the zirconium-titanium getter set forth in U.S. Pat. Nos. 2,926,981 and 3,141,830, it has remained desirable to develop a getter having equal or even greater rapidity of reaction with hydrogen and hydrogen containing compounds, and having the feature of producing negligible hydrogen gas during the reaction with moisture.

It is also desirable to eliminate one problem associated with the use of zirconium and zirconium alloys as a getter in nuclear fuel, and this problem is the tendency of zirconium and zirconium alloys to form a protective continuous film of zirconium oxide. This film inhibits the reaction of the underlying zirconium with the material to be gettered. The zirconium oxide film forms on all surfaces of a zirconium material exposed to an atmosphere containing oxygen at reactor operating temperatures.

SUMMARY OF THE INVENTION

A particularly effective getter overcoming the foregoing problems is in the form of a composite which is disposed in a nuclear fuel element. The getter comprises a bimetallic composite with a substrate having thereon a coating capable of gettering reactive gases including a source of hydrogen such as hydrogen, water vapor and hydrogen-containing compounds. The coating covers at least a portion of the substrate and the substrate has a greater (or larger) coefficient of thermal expansion than does the coating so that the substrate exerts pressure on the coating producing intermittent fracturing of the surface film and ultimately the coating. The fracture of any film on the surface of the coating includes any protective oxide film and this exposes fresh surfaces of the coating for gettering during the heating cycle of the nuclear reactor. The composite may be disposed in the nuclear fuel, in the plenum of the fuel element or in both the nuclear fuel and the plenum. This arrangement of the nuclear fuel element utilizes the properties of the coating for reaction with any reactive gas and particularly any source of hydrogen present in the fuel element and enables exposure of fresh surfaces of the coating free of protective films for reaction for substantially the operating life of the nuclear fuel element. This invention further includes a method of producing a nuclear fuel element as described above.

OBJECTS OF THE INVENTION

It is an object of this invention to provide a nuclear fuel element having therein an improved getter comprising a bimetallic composite with a metallic substrate having thereon a coating capable of gettering reactive gases which coating will intermittently fracture any surface films during heating, exposing a film-free portion of the surface of the coating.

Another object of this invention is to provide a preferred and efficient embodiment of a getter having a coating of zirconium or a zirconium alloy for gettering reactive gases including a source of hydrogen such as hydrogen, water vapor or hydrogen-containing compounds.

Still another object of this invention is to provide an improved method for the manufacture of metallic clad nuclear fuel elements which includes introducing an improved getter in the fuel element for efficient protection of the cladding of the fuel element.

A further object of this invention is to provide a nuclear fuel element containing a getter capable of gettering a source of hydrogen such as hydrogen, water vapor or a hydrogen-containing compound if present in the nuclear fuel element and producing solid innocuous reaction products.

Another object of this invention is to provide a nuclear fuel element having therein a getter comprising a composite with a metallic substrate and a coating covering at least a portion of the substrate, the getter being located in a lower temperature region (plenum) of the fuel element.

The foregoing and other objects of the invention will become apparent to a person skilled in the art from reading the following specification and the appended claims with reference to the accompanying drawings described immediately hereinafter.

DESCRIPTION OF THE DRAWINGS

FIG. 1 presents a partial cutaway view of a nuclear fuel assembly containing nuclear fuel elements constructed according to the teaching of this invention with one element shown in partial sectional view.

FIG. 2 shows a cutaway view of the plenum portion of a nuclear fuel element illustrating teachings of this invention of positioning a composite material serving as a getter inside a helical member in the plenum and between two fuel pellets.

FIG. 3 shows a greatly enlarged isometric sectional view of a getter in the form of a bimetallic strip according to the teaching of this invention.

FIG. 4 shows a cutaway sectional view of a getter in the form of a discrete particle having a coating on a metallic substrate also according to the teaching of this invention.

FIG. 5 shows a greatly enlarged isometric sectional view of another embodiment of the getter in the form of a ribbon with the surface of a metallic substrate being coated according to the teaching of this invention.

DESCRIPTION OF THE INVENTION

Referring now more particularly to FIG. 1, there is shown a partially cutaway sectional view of a nuclear fuel assembly 10. This fuel assembly consists of a tubular flow channel 11 of square cross section provided at its upper end with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements 14 is enclosed in channel 11 and supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at elevated temperatures.

Referring now to FIG. 2 in addition to FIG. 1, a nuclear fuel element or rod 14' is shown in partial sectional view constructed in accordance with the teachings of this invention. The fuel element includes fuel material 16, here shown as a plurality of fuel pellets of fissionable and/or fertile material positioned within a structural cladding or container 17. In some cases the fuel pellets may be of various shapes; in other cases different fuel forms such as particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide. The container is sealed at its ends by means of end plugs 18 which may include studs 19 to facilitate the mounting of the fuel rod in the assembly. A void space or plenum 20 is provided at one end of the fuel element to permit longitudinal expansion of the fuel material and accumulation of gases released from the fuel material. A nuclear fuel material retainer means 21 in the form of a helical member is positioned within space 20 ultimately to provide restraint against the axial movement of the pellet column, especially during handling and transportation of the fuel element. Cladding 17 is secured to end plugs 18 by means of circumferential welds 22.

The fuel element is designed to provide an excellent thermal contact between the cladding and the fuel material, a minimum of parasitic neutron absorption and resistance to bowing and vibration which is occasionally caused by flow of the coolant at high velocity.

Referring now to FIG. 2, there is positioned inside helical member 21 in the plenum 20 a getter 23 in the form of bimetallic strips. The getter 23 comprises a composite with a metallic substrate having thereon a coating capable of gettering reactive gases including a source of hydrogen such as hydrogen, water vapor, and hydrogen-containing compounds, and the coating covers at least a portion of the substrate. The substrate has a larger coefficient of thermal expansion than does the coating, and the coating develops a protective film such as an oxide film with the passage of time, especially at elevated temperatures. Over a period of time at reactor operating temperatures, the protective film is fractured and fresh portions of the coating are exposed to any reactive gases including any source of hydrogen present in the fuel element permitting effective gettering of the hydrogen. The surface of the coating exposed by the fracture of the protective film will not initially have a protective film acting as a barrier to effective gettering. With further passage of time a fracture of the protective film of the coating will grow into a crack in the coating exposing further portions of the coating capable of gettering reactive gases.

In greater detail and referring to FIG. 3, the getter is in the form of a metallic strip, and substrate 24 of getter 23 is comprised of a metallic material such as nickel or nickel alloys which have a larger coefficient of thermal expansion than does the coating 25. The substrate 24 has thereon a coating 25 such as a coating of zirconium or zirconium alloys which could be referred to as a fracturable coating and a coating that develops fractures upon heating of the getter. The surface of the coating exposed by the fractures will not initially have a protective film such as a metallic oxide film which would act as a barrier to effective gettering.

The composite is preferably in the form of bimetallic strips 23 in FIG. 3 or a right circular cylinder 26 as shown in FIG. 2 although any other configuration for the composite is suitable. By way of further example, FIG. 4 presents a cutaway sectional view of a getter 27 in the form of a discrete particle having coating 29 on a metallic substrate 28. The substrate 28 of getter particle 27 is comprised of a metallic material such as nickel or nickel alloys which have a greater coefficient of thermal expansion than does coating 29. The coating 29 is comprised of a metallic material such as zirconium or zirconium alloys which could be referred to as a fracturable coating and a coating that fractures any surface film upon heating of the getter. The surface of the coating exposed by the fracture of surface films will not initially have a protective film acting as a barrier to effective gettering.

FIG. 5 presents a getter 30 in the form of a ribbon having coatings 31 on each side of a metallic substrate 32. The substrate 32 of getter ribbon 30 is comprised of a metallic material such as nickel and nickel alloys which have a larger coefficient of thermal expansion than do the coatings 31. The coatings 31 are comprised of a metallic material such as zirconium or zirconium alloys and the coating develops fractures in any protective films upon heating of the getter. The surface of the coating exposed by the fractures will not initially have a protective film acting as a barrier to effective gettering.

An effective amount of the coating for gettering is designed to be included in the composite. For example at least about 4 grams of metallic coating is designed to be included in a typical nuclear fuel element. A larger amount is used in practice and can be used in fuel elements containing nuclear fuel in powder form and in fuel elements suspected of containing large amounts of deleterious gases such as hydrogen and water vapor.

A preferred description of the getter and the properties of the getter forming a composite used in the nuclear fuel element of this invention will now be described in detail.

A getter suitable for the coating and capable of gettering a source of hydrogen and other reactive gases by chemically combining with or absorbing such materials should have a combination of properties. One desirable property is minimization of any free hydrogen after the chemical reaction of a getter with a source of hydrogen in order to prevent hydride failures of the cladding of the fuel element in which the getter is used. Thus the getter should react approximately stoichiometrically with water vapor, when it is the source of hydrogen, so that there is no substantial net source of hydrogen from the reaction. The getter should also react with water vapor at the temperature prevailing in the system in which the getter is utilized which would be in the range of about 200° to about 650° C for a preferred application of the getter in the plenum of nuclear fuel elements. The getter should also have a low neutron cross section and be inexpensive to fabricate. Preferably the getter should also have the property of reacting with gaseous hydrogen and hydrogen-containing compounds such as hydrocarbons and hydrogen fluoride.

The properties discussed above for the getter are embodied in a number of metals and alloys such as zirconium and zirconium alloys, preferably zirconium alloys having a zirconium content of at least about 50 percent zirconium by weight. One particularly preferred embodiment of this invention has a coating of metallic zirconium and zirconium alloys such as Zircaloy-2, Zircaloy-3 and Zircaloy-4. Also within the teaching of this invention are zirconium alloys with niobium, titanium, nickel, yttrium and mixtures thereof.

The metallic substrate used in forming a composite material is required to have certain properties in order to apply a tensile stress to the coating at elevated temperatures sufficient to develop fractures in the surface film on the coating. The application of the tensile stress is necessary to insure that any metallic oxide film associated with the coating, such as a zirconium oxide film associated with zirconium and zirconium alloys, is fractured during heating. This leaves unprotected, bare surfaces of the coating exposed to the environment of the fuel element and available to readily react with any reactive gas such as a source of hydrogen coming in contact with the coating. The substrate is selected from the group consisting of nickel, nickel alloys such as nickel-tin alloys, ferrous alloys such as iron-chromium-nickel alloys and a stainless steel such as 18–8 austenitic stainless steel, titanium, and titanium alloys such as titanium-nickel alloys. The foregoing metals and alloys have a greater coefficient of thermal expansion than does the coating. This results in fracture of the metallic oxide film on the coating and ultimately of the coating with exposure of fresh portions of the surfaces of the coating during each heating cycle of the nuclear fuel element.

The coating has to be attached to the substrate so that the thermal expansion in the substrate will be transmitted to the coating to initiate and develop fractures.

The coating is typically applied by plating, diffusion bonding, vapor deposition or mechanical bonding such as rolling, swaging, forging and the like. Any suitable means of applying the coating to achieve the attachment of the coating to the substrate is within the scope of this invention.

Preferred coating cross sections are at least of the order of about 20 percent of the thickness of the resulting getter cross section and up to about 60 percent of the thickness of the resulting getter cross section, and an especially preferred range for the coating cross section is about 30 to about 50 percent of the thickness of the composite. A preferred coating thickness on a substrate in the range of about 1 to about 100 mils has given excellent results.

The impurity content of the metal or alloys of this invention serving as the coating and suitable for gettering a source of hydrogen or other reactive gases is not critical to the development of the gettering properties and substantial amount of impurities can be included in such metal or alloys. In practice it has been discovered that oxygen contents up to several thousand parts per million in the getter are tolerable. Nitrogen contents up to about 750 parts per million are tolerable in utilization of the getter. The other impurities found in the getters as employed in this invention which do not hinder the use of the getter include hydrogen and carbon. Metallic impurities found in the getter which do not hinder use of the getter are hafnium and chronium. The fact that the impurity content of the getters used in this invention is not critical to the utilization of the getter for gettering hydrogen enables fabrication of the alloy from low grade components. An example would be using impure zirconium available from a zirconium production facility for the cost advantage over highly refined zirconium. However, depending upon the positioning of the getter in the fuel element, the utilization of the getters of this invention in nuclear fuel elements may necessitate control of high neutron absorption cross section impurities in the getters.

The getters of this invention have the advantage of reacting with a source of hydrogen for long periods of time due to the intermittent fracturing of the film on the coating and ultimately fracturing of the coating exposing fresh portions of the getter free of any films.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A composite getter comprising a metallic substrate having thereon a coating of a material capable of gettering reactive gases covering at least a portion of the substrate with the substrate having a greater coefficient of thermal expansion than the coating and being capable of producing tensile stress in said coating during said thermal expansion whereby said coating is intermittantly fractured by changes in temperature of said composite getter to thereby expose fresh gettering surfaces in said coating.

2. A getter according to claim 1 in which the coating is comprised of zirconium.

3. A getter according to claim 1 in which the coating is comprised of a zirconium alloy.

4. A getter according to claim 3 in which the zirconium alloy has a component selected from the group consisting of niobium, titanium, nickel, yttrium and mixtures thereof.

5. A getter according to claim 1 in which the substrate is comprised of nickel.

6. A getter according to claim 1 in which the substrate is comprised of a nickel alloy.

7. A getter according to claim 1 in which the substrate is comprised of a ferrous alloy.

8. A getter according to claim 1 in which the substrate is comprised of stainless steel.

9. A getter according to claim 1 in which the substrate is comprised of titanium.

10. A getter according to claim 1 in which the substrate is comprised of a titanium alloy.

11. A getter according to claim 1 in the form of a strip with the substrate having a coating on each side thereof.

12. A getter according to claim 1 in the form of a strip with the substrate having one side covered by the coating.

13. A getter according to claim 1 in the form of a discrete particle and the coating substantially covers the substrate.

* * * * *